United States Patent [19]
Chung

[11] Patent Number: 5,894,427
[45] Date of Patent: Apr. 13, 1999

[54] TECHNIQUE FOR CONCURRENT DETECTION OF BIT PATTERNS

[75] Inventor: Shine Chung, San Jose, Calif.

[73] Assignee: Intel Corporation, Santa Clara, Calif.

[21] Appl. No.: 08/968,565

[22] Filed: Nov. 12, 1997

[51] Int. Cl.$^6$ .................................................... G06F 5/01
[52] U.S. Cl. .............................. 364/715.11; 364/715.1
[58] Field of Search ........................ 364/715.11, 715.1, 364/715.04

[56] References Cited

U.S. PATENT DOCUMENTS

5,383,142  1/1995  Chung ................................. 364/715.11
5,724,275  3/1998  Chung ................................. 364/715.1

Primary Examiner—David H. Malzahn
Attorney, Agent, or Firm—Blakely, Sokoloff, Taylor & Zafman LLP

[57] ABSTRACT

A technique for concurrently detecting a repetitive occurrence of a bit pattern in a bit string. Successive bits of the bit string are separated into bit groupings and the combined bits are analyzed for the presence of the bit pattern. The logic for subsequent analysis to reduce the number of groupings is achieved by the use of a hierarchically decreasing logic array. At each level of the hierarchy, the bit analysis is reduced until a final output is reached. This final output provides state and address outputs for identifying the detection of the bit pattern occurrences and the address where the bit patterns occur.

23 Claims, 8 Drawing Sheets

| INITIAL 2-BIT INPUT (I1 I0) | INITIAL STATE OUTPUT | INITIAL PA1 | INITIAL PA2 |
|---|---|---|---|
| 0  0 | N | X | X |
| 0  1 | F | 1 | 0 |
| 1  0 | F | 0 | 0 |
| 1  1 | S | 0 | 1 |

| INITIAL 2-BIT INPUT (I1 I0) | INITIAL STATE OUTPUT (C1 C0) | INITIAL PA1 | INITIAL PA2 |
|---|---|---|---|
| 0  0 | N  (0 0) | X | X |
| 0  1 | F  (0 1) | 1 | 0 |
| 1  0 | F  (0 1) | 0 | 0 |
| 1  1 | S  (1 X) | 0 | 1 |

$$\text{SELECT } H1 = A1 + A0$$

$$\text{SELECT } L1 = \overline{A1}\,\overline{A0}$$

PA2:

$$\text{SELECT } H2 = A1$$

$$\text{SELECT } H1 = \overline{A1}\,\overline{B1}\,\overline{B0}$$

$$\text{SELECT } L2 = \overline{A1}\,\overline{A2}\,B1$$

$$\text{SELECT } L1 = \overline{A1}\,B0\,(\overline{B1} + A0)$$

FIG. 10

TECHNIQUE FOR CONCURRENT DETECTION OF BIT PATTERNS

BACKGROUND OF THE INVENTION

1. Field of the Invention

The present invention relates to the field of computing and, more particularly, to a technique for concurrently detecting the multiple occurrence of a bit pattern.

2. Background of the Related Art

In data processing, operations that perform pattern detection are utilized to identify the presence of a predefined pattern. One such detection scheme detects the presence of a certain bit or bit sequence in a bit string and, often times, identifies the location of the detected pattern. Detection of such bit patterns allows other operations to be performed, based on the results obtained from the detection. In one scheme, leading one ("1") detection is utilized for detecting the occurrence of the very first "1" bit in a bit string and its associated position (bit location or address) within the bit string. Processing devices, implementing such leading "1" detection circuitry, then utilize the results of the "1" detection to perform other tasks.

For example, in U.S. Pat. No. 5,383,142 (in which the inventor is the same as the inventor in the present application), a technique for detecting the occurrence of a leading "1" is disclosed. Leading "1" detection is implemented to resolve proper normalization of floating point computations. It is also implemented in queuing processor access in a multiple processor computer system. In these instances, the bit location of the leading "1" bit provides the information necessary to perform the task.

However, there are instances in which the detection of the occurrence of the second and subsequent "1" bit is desirable. For example, in a processor architecture where processors execute variable length instructions, the byte length will not be constant for all of the instructions. When these instructions are stored sequentially, the instruction boundaries will not reside at set multiples of a byte address. Thus, in order to identify the start of an instruction boundary, each byte is accessed to determine if it is an opcode, since opcodes are located at the beginning of an instruction. As a further extension to this scheme, instructions are at times pre-decoded, marked as to the instruction boundaries and stored in an instruction cache. Accordingly, to process the variable length instructions, additional time is required to find the instruction boundaries.

As noted above, one technique is to pre-decode and mark the instruction boundaries, so that the instructions can be issued. For example, a "1" bit is utilized to mark the start of each instruction and a scan for the "1" bit will find the start of an instruction. That is, identification of the location of the first "1" identifies the start of the first instruction and the identification of the location of the second "1" identifies the start of the next instruction, etc.

The rapid detection of instruction boundaries allows the processor to find and fetch the next instruction much more quickly and has significant advantages in superscalar processors which use pipelining. It is especially useful for multiple instruction issue, when two or more instructions are to be issued concurrently. The present invention provides a scheme in which the occurrence of the first "1" bit and the second "1" bit can be detected concurrently, so that one application of the invention permits two instruction boundaries to be identified concurrently. The concurrent "1" detection can be extended to locate the occurrence of subsequent "1"s as well. Furthermore, the detection technique can be utilized to detect other bit patterns and is not limited to the detection of a single bit.

SUMMARY OF THE INVENTION

The present invention describes a technique for concurrently detecting a repetitive occurrence of a bit pattern in a bit string. Successive bits of the bit string are separated into bit groupings and the combined bits are analyzed for the presence of the bit pattern. The logic for subsequent analysis to reduce the number of groupings is achieved by the use of a hierarchically decreasing logic array. At each level of the hierarchy, the bit analysis is reduced until a final output is reached. This final output provides state and address outputs for identifying the detection of the bit pattern occurrences and the addresses where the bit patterns occur.

In the preferred embodiment, a state machine implementation combines successive bits of a bit string into bit groupings, which are then coupled to a number of initial logic modules at level 1 of the hierarchy. A state output and partial address outputs are generated from each of the initial logic modules. The state output corresponds to the value (state) of the input bits and a partial address is provided for each occurrence of the bit pattern being detected.

The outputs from the initial logic module are then grouped and coupled as inputs to a subsequent logic module located at level 2 of the hierarchy. The subsequent logic modules generate a further state output depending on the combination of its state inputs. A selected partial address from the previous level is then propagated, but with a bit appended to it for extending the addressing of the bit pattern location. One partial address is again provided for each occurrence of the bit pattern being detected.

The logic modules of level 2 and the logic sequence continue to repeat down through the other levels of the hierarchy until a final level is reached, having a single logic module. The state output from the final logic module provides indication to the detection of the desired bit pattern and the partial addresses, which are now final addresses, provide the location of the desired bit pattern within the bit string.

The preferred embodiment is further described in relation to combining two successive bits to search a sixteen-bit string, in which each level of the hierarchy from level 2 and below is comprised of logic modules which combine outputs from two logic modules of the previous level. The particular technique is used to concurrently search for the occurrence of a first "1" bit and a second "1" bit.

DETAILED DESCRIPTION OF THE PREFERRED EMBODIMENTS

A technique for concurrently detecting a repetitive occurrence of a bit pattern is described. In the following description, numerous specific details are set forth, such as a specific bit pattern, bit states, state machines and logic circuitry, etc., in order to provide a thorough understanding of the present invention. However, it will be appreciated by one skilled in the art that the present invention may be practiced without these specific details. In other instances, well known techniques and structures have not been described in detail in order not to obscure the present invention. It is to be noted that a preferred embodiment of the present invention is described in reference to the detection of a first "1" bit and a concurrent detection of a second "1" bit. However, it is readily understood that the present invention can be implemented to detect other bit patterns as well, without departing from the spirit and scope of the present invention.

As noted earlier in the Background section, U.S. Pat. No. 5,383,142 describes a technique for the detection of a predetermined bit pattern, such as the first occurrence of the bit sequence "1". The present invention provides for the concurrent detection of the first and subsequent occurrence of a bit sequence. Accordingly, the preferred embodiment describes the concurrent detection of the first "1" bit and the second "1" bit. It is appreciated that embodiments for detecting the third and further occurrence of the "1" bit can be readily implemented within the scope of the present invention. Furthermore, the bit sequence need not be limited to the "1" bit. It could be for the detection of the "0" bit and can also include the detection of multiple bits. Accordingly, concurrent detection of the multiple occurrence of the "0" bit or occurrences of a bit sequence such as "101" can be achieved without departing from the spirit and scope of the present invention.

Figure 1:
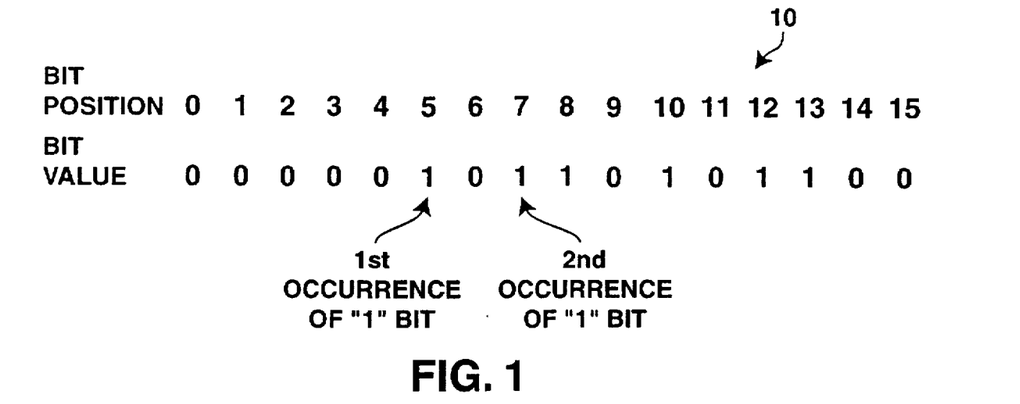
FIG. 1 shows an exemplary bit string which is sixteen bits in length and identifying the occurrence of a first "1" bit and a second "1" bit.

Referring to FIG. 1, an exemplary bit string 10 is shown. Bit string 10 is sixteen bits in length, having the particular sequence 0000010110101100. The sixteen bits are shown in corresponding bit positions 0–15 ([0:15]). The first occurrence of the "1" bit occurs at position [5] and the next "1" bit occurs at position [7]. The preferred embodiment detects and identifies the position of the first occurrence of the "1" at position [5] and concurrently detects and identifies the position of the next (or second) occurrence of the "1" at position [7].

Figure 2:
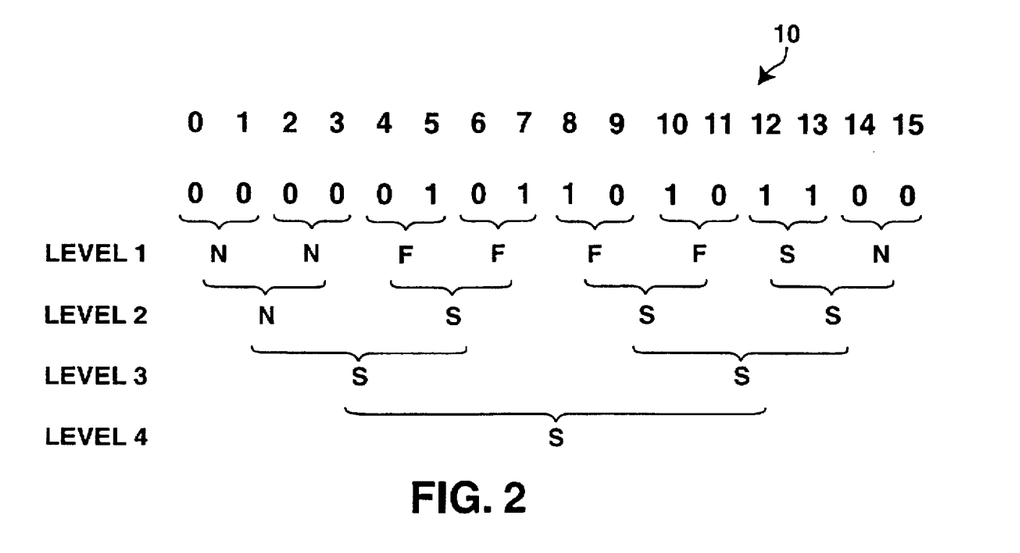
FIG. 2 shows the grouping of the exemplary bit string of FIG. 1 into successive 2-bits and generation of subsequent logic states when detecting for the occurrence of "1" bits.

In order to achieve the detection, the present invention utilizes a hierarchical arrangement of logic to process pairs of state comparisons, until a final result is obtained. Such a hierarchical arrangement of state outputs is illustrated in FIG. 2. In FIG. 2, the exemplary bit string 10 is again utilized to illustrate the detection process. As shown, each sequential two bits are paired for analysis. If the particular two bits are 00, then state N is assigned to the comparison. If the two bits have the value 01 or 10, signifying that only one "1" bit is present, then state F is assigned. If the bits have the value 11, then state S is assigned. Accordingly, level 1 of the hierarchy is shown having output states that correspond to each of the successive 2-bit comparisons.

Next, each sequential (or successive) pairs of states are compared and the results of the comparison are shown as state outputs at level 2. The first state of the pair (on the left) is the higher order state and the second state of the pair (on the right) is the lower order state. As shown in the example, the combining of the two N states (shown as {N,N}) results in N, while {F,F} results in S. Once a S state is reached, it will always propagate down the hierarchy as a S state. One state that is not shown in the example is the {N,F} condition, in which the result is always a F state. Because, there are sixteen bits, four state levels are necessary to reach a final state. It is appreciated that with thirty-two bits, five levels are needed; with sixty-four bits, six levels are needed, etc. Also, a final state of S signifies that at least two "1" bits are present in the bit string and the occurrences of the first "1" bit and the second "1" bit have been detected. A final output of N or F respectively signifies the presence of no "1" bit or only one "1" bit in the bit string.

The N, F and S states are arbitrary states assigned to develop a state machine (or a processor) which is capable of receiving inputs and generating state outputs to the next level of the hierarchy. The initial level (which is level 1) is unique from the other levels, since the inputs to this level are comprised of bit pairings of the successive bits of the bit string being analyzed. The inputs to each of the subsequent levels are the state outputs from the previous level. The hierarchical arrangement of the state analysis is better illustrated in FIG. 7. Accordingly, the descriptions relating to FIGS. 2–6 should also be read with reference to the block diagram of FIG. 7.

Figure 3A:
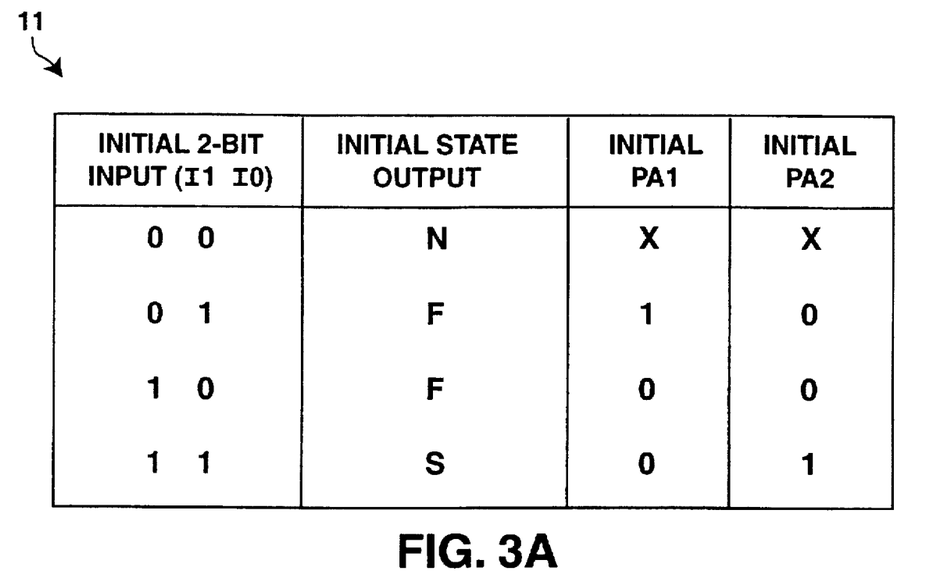
FIG. 3A shows a state table in which output states and partial addresses are generated based on the initial 2-bit input from a bit string, such as the exemplary bit string of FIGS. 1 and 2.

In FIG. 3A, a state table 11 for determining the state outputs from the initial 2-bit pairing is shown. In the state table 11, each 2-bits of the pairing are identified as I1 and I0, with I1 being the higher order bit. Thus, for the bit pairing [4:5], bit [4] is the higher order bit and bit [5] is the lower order bit. Since there are two bits, four possible combinations are possible. As noted, when there are no "1" bits in the pairing, state N is generated. If there is one "1" bit, state F is generated. If both bits are "1", then state S is generated. Thus, these three states designate the no "1", one "1" and both "1" conditions of the bit pairing.

Figure 3B:
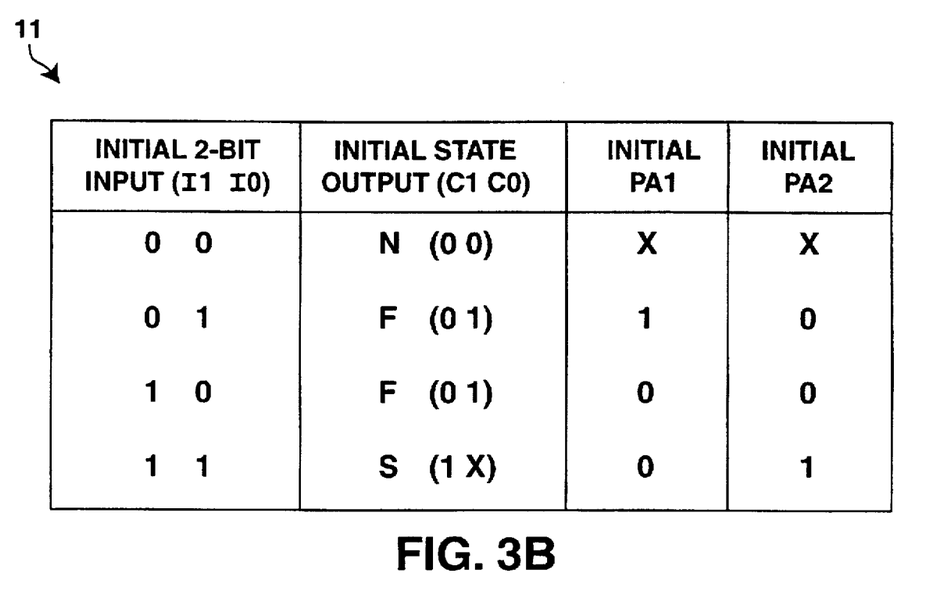
FIG. 3B shows a state table in which particular bit assignments are utilized to designate the output states of the state table in FIG. 3A for the implementation of the preferred embodiment.

It is appreciated that the states can be represented by an arbitrary assignment of bit states. In the preferred embodiment, each of the three states are exemplified by a two bit code and the bit assignments are utilized throughout the remaining examples described herein. The three states are represented by 00 for N, 01 for F and 1x for S (the x denoting a don't care condition). The state transitions to the next level are provided by output bits C1 and C0, as illustrated in FIG. 3B. Again these output bit values are provided for exemplary purpose only. The implementation of this particular state machine is then further described below.

Although the output states identify the number of "1" in the pairing, the address location information is not provided with the state output. A separate partial address (PA) is required to provide address information on the location of the "1" bit(s). Since the preferred embodiment looks for the occurrence of the first "1" bit and the second "1" bit, two partial addresses (PA1 and PA2) are needed. Both of the partial addresses are propagated down the hierarchy, wherein at each level a selection is made based on the state logic, so that a set of new partial addresses are provided as outputs. The final stage of the hierarchy provides outputs which identify the address information of the first and second "1" bits.

Figure 7:
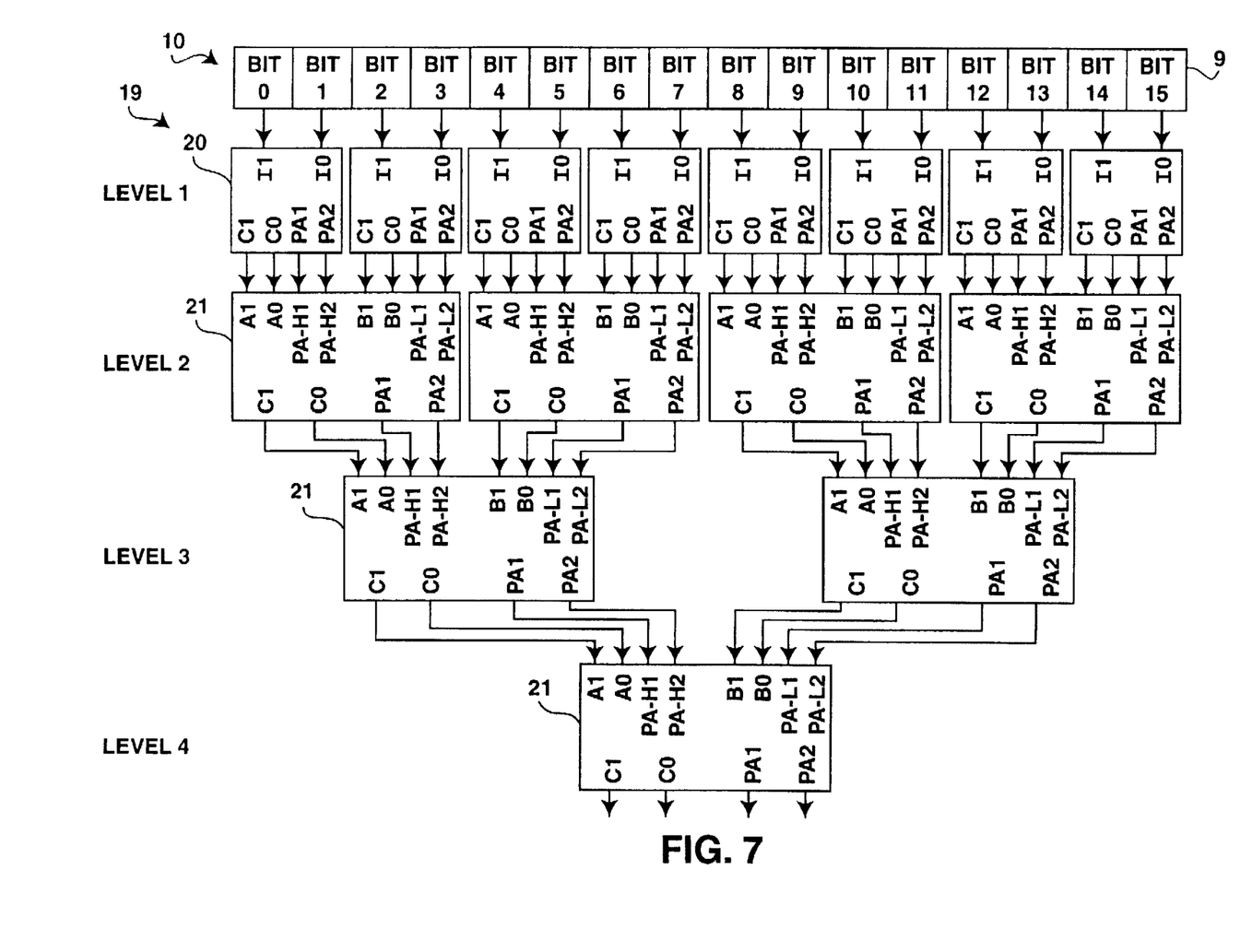
FIG. 7 is a circuit block diagram showing an implementation of the hierarchical detection scheme of the present invention in a state machine array.

In table 11, the values of the partial addresses PA1 and PA2 are shown. It is to be noted that the state and partial address outputs noted in the state table of FIGS. 3A and 3B pertain only to the initial level of the hierarchy where the bit pairings are performed. In FIG. 7, a plurality of circuit modules 20 are shown for generating the required state table 11 outputs for each of the 2-bit pairings of bit string 10. The bit string typically resides (stored) in a register, such as register 9 of FIG. 7. With sixteen bits, eight such modules 20 are needed. For each module 20, the 2-bit pairings are coupled as inputs I1 and I0, with the higher order bit being coupled to I1. The state output is identified by the two bits C1 and C0. The two partial address are shown as PA1 and PA2.

Figure 4A:
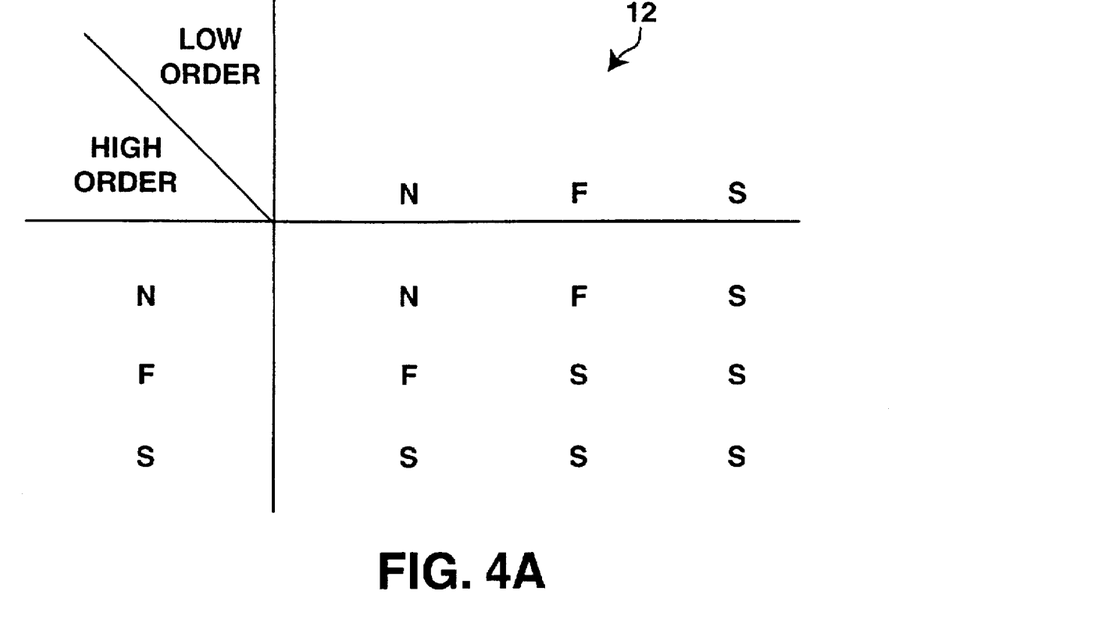
FIG. 4A shows a state table in which an output state is generated in response to two state inputs from a detection hierarchy, such as the hierarchy shown in FIG. 2.
Figure 4B:
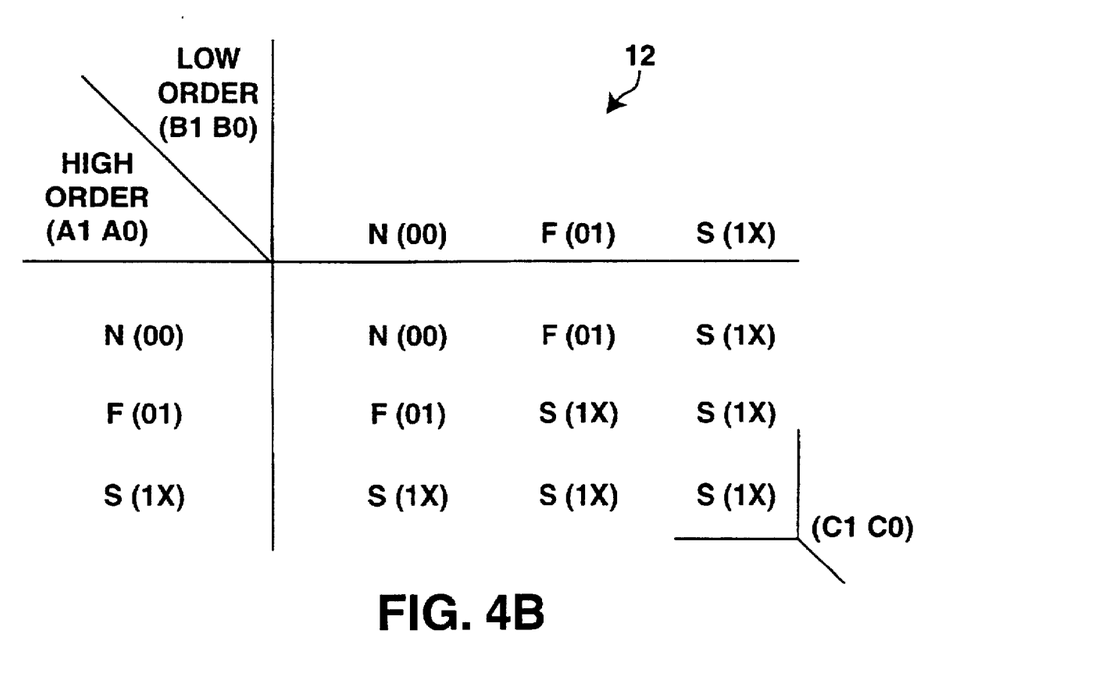
FIG. 4B shows the state table of FIG. 4A with particular bit assignments for implementation of the preferred embodiment.

In FIG. 4A, a state table 12 is shown for the state generation at the subsequent levels. FIG. 4B shows a particular implementation of the state table 12 as practiced in the preferred embodiment. As illustrated in FIG. 2, the propagation of the initial state analysis is performed in the subsequent levels (level 2-4 in the example). That is, for level 2 and below, state table 12 is utilized to determine the state outputs from the evaluation being performed on each pair of state inputs. The higher order state input is designated by bits A1 and A0 and the lower order state input is designated by bits B1 and B0. The two bits designating the state output are designated C1 and C0 and their values are also shown.

Figure 5:
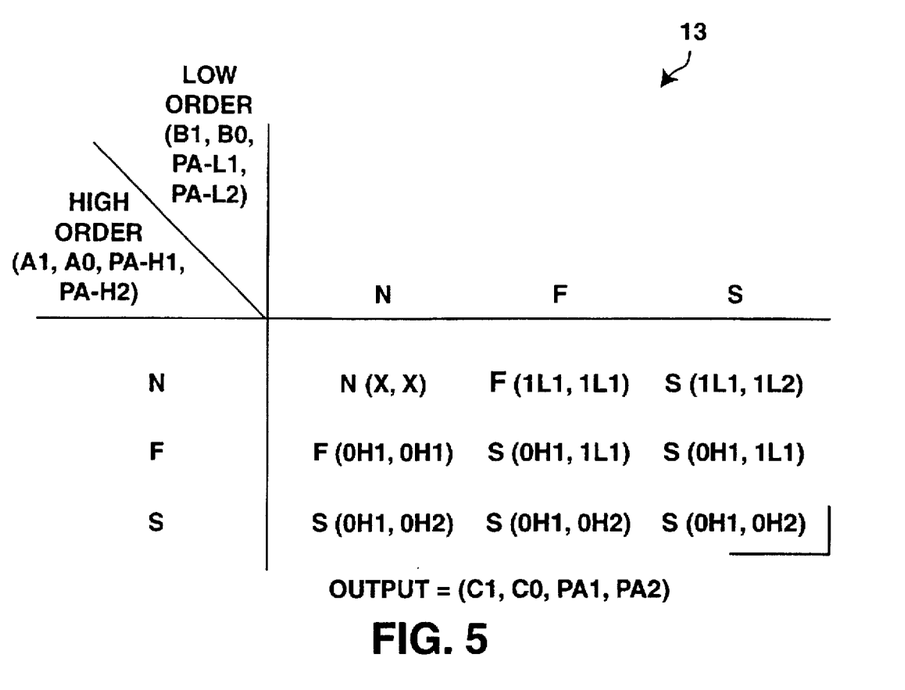
FIG. 5 shows the state table of FIGS. 4A and 4B, but also showing various combination of partial address outputs associated with the state outputs.

In order to propagate the partial addresses down the hierarchy, a state table for the partial address generation is required. Referring to FIG. 5, a state table 13 is shown for identifying the partial address outputs at level 2 and below. It is appreciated that table 13 is an extension of table 12. In table 12, the bit pattern pertaining to the state output (C1 C0) generation is shown. In table 13, the logic for generating the partial addresses for each stage is shown. The description for the generation of the partial addresses can be better understood when viewed also with FIG. 7.

The generation of the two partial addresses at level 2 and below will depend on the corresponding state and pair of PA1 and PA2 inputs from the previous level. In FIG. 7, a plurality of circuit modules 21 are utilized at level 2 and below to generate the state outputs associated with state table 12. Note that level 1 has modules 20, but all other levels have modules 21. Each of the modules 21 receives two sets of state (C1 and C0) outputs and partial addresses PA1 and PA2 from successive pair of modules 20 or 21 of the previous level. The outputs from the higher order module of the previous level are designated as higher order inputs (A1, A0, PA-H1 and PA-H2) to the module 21. A1 and A0 are the higher order state inputs, PA-H1 is the higher order PA1 and PA-H2 is the higher order PA2. Likewise, outputs from the corresponding lower order module are designated as lower order inputs (B1, B0, PA-L1 and PA-L2). B1 and B0 are the lower order state inputs, PA-L1 is the lower order PA1 and PA-L2 is the lower order PA2. The outputs are C1 and C0 for the state and PA1 and PA2 for the partial addresses, which then become inputs to the next lower level.

As noted in table 13, the partial address outputs will depend on the state ordering of the previous level pairings. Thus, partial addresses from a {N,S} pairing is different than a {S,N} pairing. Since the partial addresses identify the addresses of the occurrences of the "1" bit, ordering of the PA1-PA2 pairs must be propagated from level to level. The state table 13 requires that one of the four partial address inputs be selected as an output PA1 and one of the four partial address inputs be selected as output PA2 for each module 21.

Additionally, for each level traversed, an additional bit must be appended as a prefix to the partial address outputs to increase the base length of the overall addressing capability. Either a "1" or a "0" value is appended, depending on the selection of the higher or lower order partial address. When a higher order partial address input is selected, "0" is appended. When a lower order partial address input is selected, "1" is appended. For example, when PA-H1 is selected to be propagated through to the next level, "0" is appended as a prefix. When PA-L2 is selected to be propagated through to the next level, "1" is appended.

As an example, if the two-state pairing is {F,S} (F being the higher order element and S the lower order element) from the previous level, the output is shown as S (0H1, 1L1). That is, the state output from the present level is state S. The PA1 of the higher order element (PA-H1) is propagated through with a "0" appended to it as the current PA1 output. The PA1 of the lower order element (PA-L1) is propagated through with a "1" appended to it as the current PA2. The output signals are C1, C0, PA1 and PA2.

It is appreciated that in table 13, the two partial address outputs for the condition {N,N} are the don't care condition (x,x). Since no "1" is present with state {N,N}, this output is never propagated (except when there are no "1" at all in the bit string 10). Accordingly, any value can be propagated for PA1 and PA2 when the condition is {N,N}.

It is also appreciated that other logic sequences can be devised for resolving the state combinations as shown in the state tables 11-13 for implementing the present invention. However, the ordering of pair groupings of both bits or states in a hierarchical array arrangement is preferred. Accordingly, as shown in FIG. 7, a hierarchically arranged state machine array 19 is shown. The array 19 can be implemented as a separate unit or incorporated into a processor. Generally for the applications described in implementing the preferred embodiment, the state machine array is implemented as part of a processor, such as in a microprocessor chip. The manner in which the present invention is implemented is dependent on the particular application in which the present invention is utilized.

The array 19 is configured having four hierarchical levels to process the sixteen bits of bit string 10. Level 1 of the hierarchy is comprised of eight modules 20 for the initial processing of the sequential bit pairings of bit string 10. As noted above, the logic of the state table 11 is implemented within module 20. The outputs from each module 20 is comprised of the 2-bit state signal (C1 and C0), a single bit PA1 and a single bit PA2. Thus, for the left most module illustrated in level 1 (which is the highest order module for the level), bit |0| is coupled to the I1 input and bit |1| is coupled to the I0 input. The remaining bits are coupled successively to the remaining modules 20. The bit numbering is done in an ascending order, so that the number corresponds to the address location provided by the partial addresses.

The subsequent levels of the hierarchy are comprised of modules 21. The number of modules at each level decreases by a factor of two, since each module 21 is designed to receive and process two sequential sets of state and partial address signals from the previous level. The higher order set of inputs are labeled A1, A0, PA-H1 and PA-H2, which correspond to the signals C1, C0, PA1 and PA2, respectively, from the higher order module outputs of the previous level. The lower order set of inputs are respectively labeled B1, B0, PA-L1 and PA-L2. Each module 20 processes the signals pursuant to the logic of the state tables 12 and 13 and generates the output signals C1, C0, PA1 and PA2 to the next level. This process is repeated at each level until the final level is reached.

At each progressive level, an additional bit is appended as a prefix to each partial address being propagated through that level. Thus, at level 1, each of the partial address PA1 or PA2 is one bit long. At level 2, it is two bits long and at level 3, it is three bits long. Finally at the final level (level four), it is four bits long to identify one of the sixteen bit positions [0:15]. The output of the single module at level 4 provides the final output.

Figure 6:
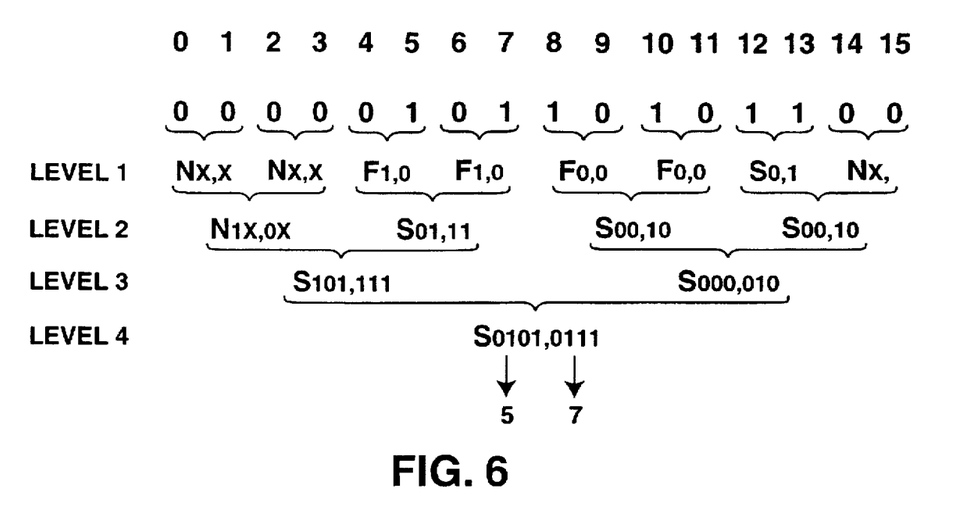
FIG. 6 shows the state and partial address outputs for detecting and identifying the occurrence of the first and second "1" bits for the exemplary bit string of FIG. 1 based on the state tables of FIGS. 3–5.

The C1 C0 signal identifies the final state output. If at least two "1" bits are present, then state S is indicated. Otherwise, state N or F will be present to indicate none or one "1" in the bit string. The PA1 signal is four bits long and its value indicates the bit position of the occurrence of the very first "1" bit. The PA2 signal is also four bits long and its value indicates the bit position of the occurrence of the second "1" bit. For the example bit string 10 of FIGS. 1 and 2, the state and partial address outputs at the various levels are illustrated in FIG. 6. The final output of S 0101,0111 indicates that at least two "1" bits are present, that the first "1" bit is at bit position 5 (0101 in binary) and that the second "1" bit is at position 7 (0111 in binary).

Figure 8:
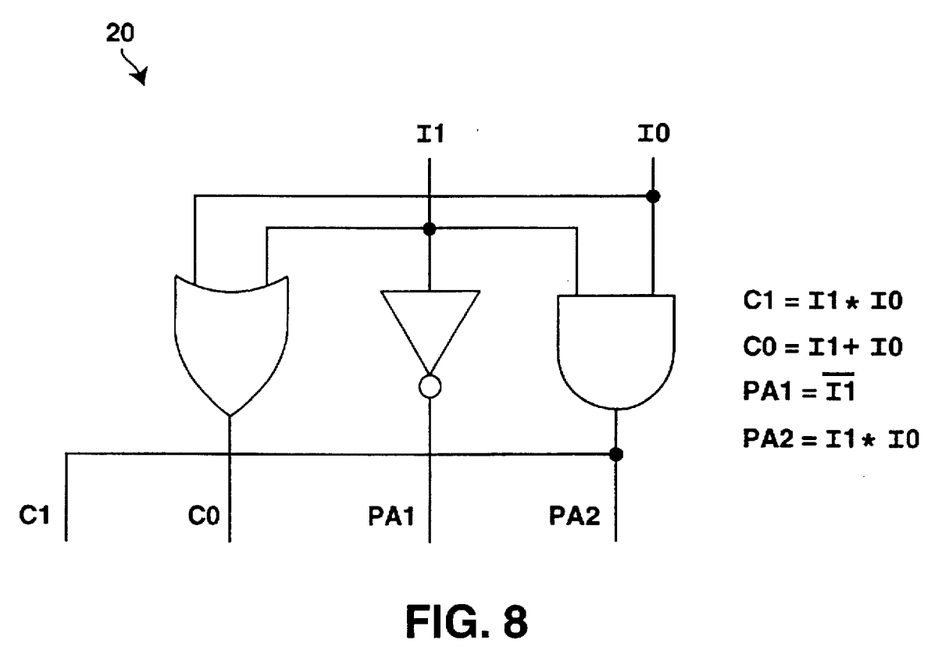
FIG. 8 is a circuit diagram of an initial logic module of the state machine array of FIG. 7 and logic equations for determining the outputs from the initial logic module.
Figure 9:
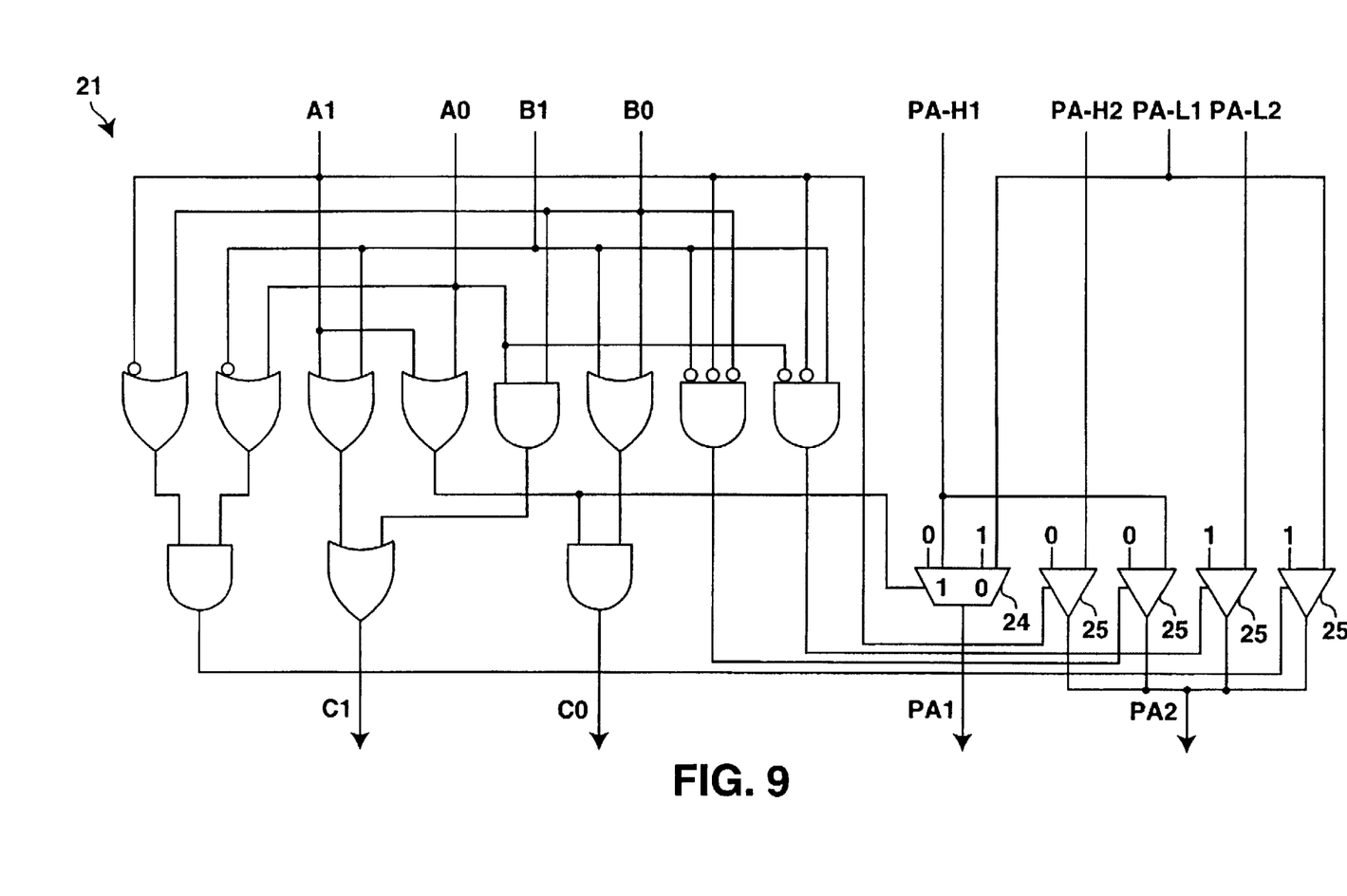
FIG. 9 is a circuit diagram of an subsequent logic module of the state machine array of FIG. 7.
Figure 10:
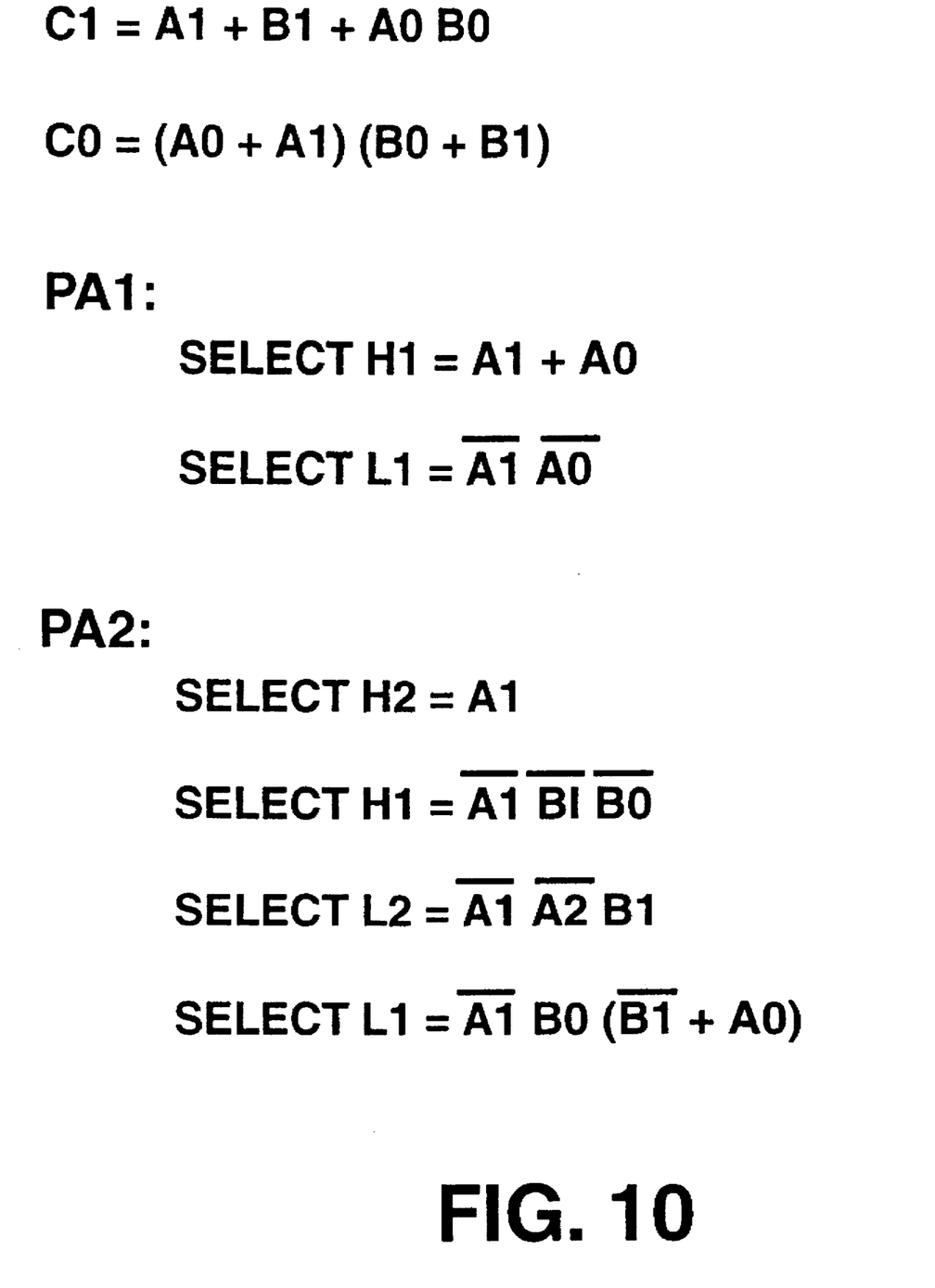
FIG. 10 shows logic equations for determining the outputs from the subsequent logic module of FIG. 9.

A variety of circuitry can be implemented within the modules 20 and 21 to provide the various state outputs. The FIGS. 8–10 show one implementation of logic for modules 20 and 21, based on the particular variable assignment of FIG. 3B. The logic equations for generating C1, C0, PA1 and PA2 based on inputs I1 and I0 are also shown in FIG. 8. Note that these equations provide selective output signals for the don't care conditions shown in FIG. 3B.

FIG. 8 shows an implementation of a logic circuit for the module 20 and FIG. 9 shows an implementation of a logic circuit for module 21. The accompanying logic equations are noted in FIGS. 8 and 10. The equations of FIG. 10 provide the logic for generating C1 and C0, and control signals for propagating PA-H1, PA-H2, PA-L1 and PA-L2. As noted in the state tables of FIGS. 4A–B and 5, PA1 output from the module 21 can only be the propagation of PA-H1 or PA-L1. Note that the don't care state uses the L1 output in this instance. A select signal to multiplexer (mux) 24 selects between the PA-H1 and PA-L1 signals for propagation as output PA1. A "0" or a "1" is appended also through mux 24.

The propagation of the PA2 signal requires a selection among the four partial address inputs. Accordingly, a four way mux or four selection devices are needed to select one of the four partial address inputs for propagation as an output PA2. In the example, four tri-state buffers 25 are used, wherein the appropriate buffer is activated for propagating the partial address. A corresponding "0" or a "1" bit is also appended through the buffers 25 for propagation to the output. Thus, each module 21 provides the requisite outputs as stated in tables 12 and 13.

It is appreciated that a variety of circuits can be designed to provide the necessary state logic for practicing the present invention. Furthermore, the hierarchical arrangement of the state machine array can be designed in a variety of ways without departing from the spirit and scope of the present invention. The preference is to arrange the array in pairings so that each level results in the reduction of logic by a factor of 2. However, a grouping other than that of two successive bits or state comparisons can be readily achieved, although complicating the logic circuitry required for modules 20 and 21. Furthermore, although the examples herein are described in reference to a sixteen-bit string, the hierarchy can be readily extended to a longer bit string, such as 64- or 128-bits, or applied to a shorter bit string as well.

It is also appreciated that the present invention can be extended to detect a third and further occurrences of the "1" bit(s). In that instance, one additional partial address will need to be generated for each additional "1" bit being detected. The state logic tables will need to be expanded to identify additional states. With concurrent detection of three bits, an additional state will need to be defined for the instance when three "1"s are detected.

Finally, the present invention can also be extended to detect the concurrent detection of two or more occurrences of a bit sequence, such as sequence "101". However, the logic required to provide the necessary state tables and the partial addresses for propagation become considerably more complex. In that instance, instead of identifying a single bit for analysis, a sequence of bits will need to be evaluated and detected. The actual circuit implementation is more complex, but the detection technique is still within the spirit and scope of the present invention.

Thus, a scheme for concurrently detecting multiple occurrences of a bit pattern is described.

I claim:

1. An apparatus for concurrently detecting a first and subsequent occurrences of a bit pattern in a bit string comprising:

a plurality of first logic modules forming a first level of a logic hierarchy, wherein each of said first logic modules is coupled to receive successive bits of said bit string and for generating a state output and a plurality of partial address outputs, corresponding to bit values and bit locations for said successive bits received;

a plurality of second logic modules arranged in a decreasing array below said first level to form subsequent levels of said logic hierarchy, until a final second logic module resides at a final level of said logic hierarchy;

said second logic modules coupled to receive state and partial address outputs from more than one of said first or second logic modules of a previous level and for generating a subsequent state output and partial addresses to a respective subsequent level based on received states and partial addresses, until a final state and partial address outputs are generated to identify detection and locations of said bit pattern occurrences.

2. The apparatus of claim 1 wherein a partial address is generated by each module for detection of each occurrence of said bit pattern and generation of each partial address from a particular second logic module is achieved by propagating a partial address from a previous level of said hierarchy.

3. The apparatus of claim 2 wherein a bit is appended to each partial address generated by said second logic modules at levels subsequent to said first level.

4. The apparatus of claim 3 wherein said bit pattern being detected is a single bit.

5. The apparatus of claim 4 wherein two partial addresses are generated and propagated for detecting the occurrences of a first "1" bit and a second "1" bit.

6. The apparatus of claim 4 wherein said first logic modules process a sequence of two successive bits and each second logic module processes state and partial address outputs from a pair of logic modules of a previous level.

7. A state machine for concurrently detecting a first occurrence of a bit value and a second occurrence of the same bit value in a bit string comprising:

a plurality of first logic modules forming a first level of a logic hierarchy, wherein each of said first logic modules is coupled to receive two successive bits of said bit string and for generating a state output corresponding to a number of a particular bit value present in its respective two successive bits received and generating a first and second partial address outputs corresponding to values of its respective two bits;

a plurality of second logic modules arranged in a decreasing array below said first level to form subsequent levels of said logic hierarchy, until a final second logic module resides at a final level of said logic hierarchy;

said second logic modules coupled to receive state, first and second partial address outputs from more than one of said first or second logic modules of a previous level and for generating a subsequent state, first and second partial address outputs to a respective subsequent level based on received states and partial addresses, until a final state, first and second partial address outputs are generated to identify detection and locations of said first and second bit value occurrences.

8. The state machine of claim 7 wherein a generation of each partial address from a particular second logic module is achieved by propagating a partial address from a previous level of said hierarchy.

9. The state machine of claim 8 wherein a bit is appended to each partial address generated by said second logic modules at levels subsequent to said first level.

10. The state machine of claim 9 wherein said second logic modules are each arranged to process state, first and second partial address outputs from a pair of first or second logic modules of a previous level.

11. The state machine of claim 10 wherein said bit value being detected is a "1" bit.

12. A processor for concurrently detecting a first and subsequent occurrences of a bit pattern in a bit string comprising:

a register for holding said bit string;

a plurality of first logic modules coupled to said register and forming a first level of a logic hierarchy, wherein each of said first logic modules receives successive bits of said bit string and for generating a state output and a plurality of partial address outputs, corresponding to bit values and bit locations for said successive bits received;

a plurality of second logic modules arranged in a decreasing array below said first level to form subsequent levels of said logic hierarchy, until a final second logic module resides at a final level of said logic hierarchy;

said second logic modules coupled to receive state and partial address outputs from more than one of said first or second logic modules of a previous level and for generating a subsequent state output and partial addresses to a respective subsequent level based on received states and partial addresses, until a final state and partial address outputs are generated to identify detection and locations of said bit pattern occurrences.

13. The processor of claim 12 wherein a partial address is generated by each module for detection of each occurrence of said bit pattern and generation of each partial address from a particular second logic module is achieved by propagating a partial address from a previous level of said hierarchy.

14. The processor of claim 13 wherein a bit is appended to each partial address generated by said second logic modules at levels subsequent to said first level.

15. The processor of claim 14 wherein said bit pattern being detected is a single bit.

16. The processor of claim 15 wherein two partial addresses are generated and propagated for detecting the occurrences of a first "1" bit and a second "1" bit.

17. The processor of claim 15 wherein said first logic modules process a sequence of two successive bits and each second logic module processes state and partial address outputs from a pair of logic modules of a previous level.

18. A method for concurrently detecting a first and subsequent occurrences of a bit pattern in a bit string, comprising the steps of:

a) separating said bit string into a plurality of bit groupings;

b) generating a state output and a plurality of partial address outputs for each of said bit groupings, wherein each of said first state outputs corresponds to bit values of bits in its respective grouping and said partial address outputs correspond to ordering of said bit values, at least one partial address being generated for detection of each occurrence of said bit pattern;

c) combining a plurality of state and partial address outputs as inputs to a subsequent stage of a decreasing hierarchical logic array;

d) generating subsequent state and partial address outputs based on state and partial address outputs of a previous level of said array;

e) repeating steps c) and d) until one final state output remains with its associated partial addresses, said final state output identifying the occurrences of said bit pattern and each of its partial addresses identifying an address location of each bit pattern occurrence being detected.

19. The method of claim 18 further including the step of appending a bit to each partial address being generated to extend its address, said step being performed after step d) but prior to step e).

20. The method of claim 19 wherein said step of separating said bit string into a plurality of bit groupings further includes the step of separating said bit string into groupings of two bits.

21. The method of claim 20 wherein said steps are performed to detect multiple occurrences of a single bit.

22. The method of claim 20 wherein said steps are performed to detect the first and second occurrences of a bit.

23. The method of claim 20 wherein said steps are performed to detect the first and second occurrences of a "1" bit.

* * * * *